(12) United States Patent
Fischer et al.

(10) Patent No.: US 12,012,173 B2
(45) Date of Patent: Jun. 18, 2024

(54) TILT-DECOUPLED STEERING DEVICE OF A MOTORBIKE

(71) Applicant: Bayerische Motoren Werke Aktiengesellschaft, Munich (DE)

(72) Inventors: Dirk Fischer, Garching (DE); Gerhard Forster, Regensburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 546 days.

(21) Appl. No.: 17/295,918

(22) PCT Filed: Nov. 13, 2019

(86) PCT No.: PCT/EP2019/081181
§ 371 (c)(1),
(2) Date: May 21, 2021

(87) PCT Pub. No.: WO2020/151848
PCT Pub. Date: Jul. 30, 2020

(65) Prior Publication Data
US 2022/0009584 A1    Jan. 13, 2022

(30) Foreign Application Priority Data

Jan. 23, 2019    (DE) ..................... 10 2019 101 612.6

(51) Int. Cl.
*B62K 21/04* (2006.01)
*B62K 21/08* (2006.01)
*B62K 21/20* (2006.01)

(52) U.S. Cl.
CPC .............. *B62K 21/04* (2013.01); *B62K 21/08* (2013.01); *B62K 21/20* (2013.01)

(58) Field of Classification Search
CPC ........ B62K 21/00; B62K 21/04; B62K 21/08; B62K 21/18; B62K 21/20; B62K 21/22
See application file for complete search history.

(56) References Cited

U.S. PATENT DOCUMENTS 7,832,752 B2 * 11/2010 Czysz .................... B62K 21/20
                                                    74/551.8
8,833,785 B2 *  9/2014 Wagner .................. B62K 21/00
                                                    180/219
(Continued)

FOREIGN PATENT DOCUMENTS

CN    2319299 Y     5/1999
CN    207985062 U  10/2018
(Continued)

OTHER PUBLICATIONS

Chinese-language Office Action issued in Chinese Application No. 201980071404.0 dated Jan. 4, 2022 with English translation (14 pages).

(Continued)

*Primary Examiner* — Tony H Winner
*Assistant Examiner* — Hosam Shabara
(74) *Attorney, Agent, or Firm* — Crowell & Moring LLP

(57) ABSTRACT

A tilt-decoupled steering device of a motorbike includes a handlebar bridge for receiving a motorbike handlebar, a fork bridge for receiving a fork leg, and at least one decoupling device connecting the handlebar bridge to the fork bridge. The handlebar bridge is mounted such that it can rotate about a steering axis and is secured about a tilt axis orthogonal to the steering axis, and the fork bridge is mounted such that it can rotate about the steering axis and about the tilt axis. The decoupling device transfers a steering movement and a steering torque in a steering direction about the steering axis between the handlebar bridge and the fork bridge, and compensates for a tilting movement in a tilting direction about the tilt axis of the fork bridge relative to the handlebar bridge.

15 Claims, 6 Drawing Sheets

(56) References Cited

U.S. PATENT DOCUMENTS

| | | | | |
|---|---|---|---|---|
| 9,745,017 | B2* | 8/2017 | Tomura | B62K 21/20 |
| 2002/0084619 | A1* | 7/2002 | Odom | B62K 21/14 |
| | | | | 280/274 |
| 2005/0046141 | A1* | 3/2005 | Gogo | F16F 9/064 |
| | | | | 280/271 |
| 2009/0058040 | A1 | 3/2009 | Woesle et al. | |

FOREIGN PATENT DOCUMENTS

| | | |
|---|---|---|
| CN | 101384472 A | 3/2019 |
| DE | 37 08 579 A1 | 9/1988 |
| DE | 44 22 201 A1 | 5/1995 |
| DE | 10 2006 011 850 A1 | 9/2007 |
| EP | 0 245 221 A2 | 11/1987 |
| EP | 0 507 088 A1 | 10/1992 |
| EP | 3 031 708 A1 | 6/2016 |
| FR | 2 744 980 A1 | 8/1997 |
| WO | WO-9513207 A1 * | 5/1995 ............ B62K 21/20 |
| WO | WO 97/26178 A1 | 7/1997 |

OTHER PUBLICATIONS

International Search Report (PCT/ISA/210) issued in PCT Application No. PCT/EP2019/081181 dated Feb. 18, 2020 with English translation (four (4) pages).

German-language Written Opinion (PCT/ISA/237) issued in PCT Application No. PCT/EP2019/081181 dated Feb. 18, 2020 (five (5) pages).

German-language Search Report issued in German Application No. 10 2019 101 612.6 dated Aug. 16, 2019 with partial English translation (13 pages).

* cited by examiner

TILT-DECOUPLED STEERING DEVICE OF A MOTORBIKE

BACKGROUND AND SUMMARY OF THE INVENTION

The invention relates to a tilt-decoupled steering apparatus of a motorcycle, and to a motorcycle having a tilt-decoupled steering apparatus of this type.

A multiplicity of front wheel suspension systems in motorcycles or single-track motor vehicles are already known in the prior art. The known front wheel suspension systems also include the front wheel suspension system which is currently known under the designation Telelever. This consists substantially of an adapted telescopic fork, a trailing arm and a suspension strut. The front wheel of the motorcycle is controlled and a steering movement is transmitted to the front wheel by way of the telescopic fork which comprises two fork legs and two fork bridges which connect the fork legs to one another. Here, as a rule, the telescopic fork or the fork legs does/do not take over the suspension and damping of the front wheel. A first fork bridge connects the fork legs at an upper end close to the motorcycle handlebar, and, in the prior art, is connected rotatably to a steering head of the motorcycle or to a frame of the motorcycle. A second fork bridge connects the fork legs close to the front wheel. The trailing arm is connected rotatably to the second fork bridge and the motorcycle frame, and is therefore mounted rotatably like a swing arm. The suspension strut is arranged between the trailing arm and the motorcycle frame or the steering head of the motorcycle, which suspension strut supports said trailing arm and motorcycle frame or steering head of the motorcycle with respect to one another. In the case of a movement of the front wheel upward or downward, said movement is sprung or damped by the suspension strut via the lower fork bridge and the trailing arm. Here, not only a rebound or compression movement along the fork legs or along the suspension strut occurs on account of the kinematics of the front wheel suspension, but rather also a rotation or a tilt movement of the entire telescopic fork about a tilt axis on the steering head, which tilt axis is orthogonal with respect to the steering axis, with the result that the angle between the telescopic fork and the motorcycle frame changes. In the case of the systems which are known in the prior art, said tilt movement is usually transmitted directly to the motorcycle handlebar and via the latter to the rider of the motorcycle. Tilt movements of this type can unsettle the rider and, for example, can lead to riding errors as a result.

Therefore, the invention is based on the object of overcoming the abovementioned disadvantages and of providing a steering apparatus, by way of which the motorcycle handlebar is decoupled from a tilt movement of the fork legs about a tilt axis which runs orthogonally with respect to the steering axis.

Said object is achieved by way of a tilt-decoupled steering apparatus of a motorcycle. The steering apparatus comprises a handlebar bridge for receiving a motorcycle handlebar, a fork bridge for receiving a fork leg, and at least one decoupling apparatus which connects the handlebar bridge to the fork bridge. The handlebar bridge is mounted such that it can be rotated about a steering axis and is fixed about a tilt axis which is orthogonal with respect to the steering axis, as a result of which the handlebar bridge or the motorcycle handlebar which is received on it can be rotated only about the steering axis and not about the tilt axis. The fork bridge is mounted such that it can be rotated about the steering axis and about the tilt axis, with the result that the fork bridge with the fork legs which are preferably arranged on it can carry out both a steering movement about the steering axis and a tilt movement about the tilt axis. In order for it to be possible for a steering torque which is applied to the handlebar bridge by the rider via the motorcycle handlebar or a steering movement about the steering axis to be transmitted from the handlebar bridge to the fork bridge and via the fork bridge and the fork leg or legs to the front wheel of the motorcycle, the decoupling apparatus is configured to transmit a steering movement and a steering torque in a steering direction about the steering axis between the handlebar bridge and the fork bridge, and to compensate for a tilt movement in a tilt direction about the tilt axis of the fork bridge with respect to the handlebar bridge, with the result that, although a steering movement is transmitted from the handlebar bridge to the fork bridge, a tilt movement is not transmitted from the fork bridge to the handlebar bridge.

Since both the handlebar bridge and the fork bridge can be rotated about the steering axis, a steering movement or a steering force or a steering torque can be transmitted between them by the decoupling apparatus. In the case of a tilt movement, however, the handlebar bridge does not follow the tilt movement, with the result that the handlebar bridge or the motorcycle handlebar which can be fixed thereon does not tilt in the case of a tilt movement of the fork bridge. In the case of a movement of the fork bridge with respect to the handlebar bridge about the tilt axis, the tilt movement caused as a result of the fork bridge is compensated for by the decoupling apparatus by way of elastic deformation or kinematics which permit said movement, with the result that the fork bridge can move substantially about the tilt axis in a manner which is decoupled from the handlebar bridge.

It is particularly advantageous if the decoupling apparatus is configured so as to be rigid in a circumferential direction about the steering axis, with the result that the decoupling apparatus exhibits rigid behavior in the case of a steering movement or about the steering axis, and the steering movement or the steering torque is transmitted directly between the fork bridge and the handlebar bridge.

In addition, a variant of the steering apparatus is advantageous, in the case of which said steering apparatus comprises a steering pin which is fixed on the handlebar bridge, extends coaxially along the steering axis, can be mounted rotatably on a motorcycle frame of the motorcycle, and can preferably be received on the motorcycle frame or a steering head which is connected to the motorcycle frame, with the result that the handlebar bridge can be connected by way of the steering pin to the motorcycle frame such that it can be rotated about the steering axis and is fixed with respect to the tilt axis.

In order to make a rotation of the fork bridge both about the steering axis and about the tilt axis possible, a further advantageous refinement of the invention provides that, furthermore, the steering apparatus comprises a pivot bearing with an inner ring and an outer ring. The inner ring of the pivot bearing is arranged or fixed on the steering pin or the motorcycle frame concentrically with respect to the steering axis. Moreover, the outer ring of the pivot bearing is connected to the fork bridge, with the result that the fork bridge can be connected by way of the pivot bearing to the motorcycle frame such that it can be rotated about the steering axis and about the tilt axis. For this purpose, the inner ring preferably has a spherical, convex external diameter, the outer ring being shaped concavely on the inner side in a manner which corresponds to the former, with the result that the outer ring can be moved around the inner ring both about the rotational axis and about the tilt axis or about a bearing point which is defined in the center of the inner ring. A pivot bearing of this type can be configured as a bearing which was known on the application date as a UNIBAL pivot bearing.

One advantageous variant of the steering apparatus provides, furthermore, that the decoupling apparatus comprises at least one transmission pin and a bearing for transmitting the steering torque. The transmission pin is fixed on the handlebar bridge eccentrically with respect to the steering axis, but can also be configured integrally with it, and extends toward the handlebar bridge into the bearing of the decoupling apparatus. Preferably, the transmission pin runs parallel to the steering axis. The bearing of the decoupling apparatus is received in the fork bridge and is configured to compensate for the tilt movement of the fork bridge in the tilt direction about the tilt axis with respect to the transmission pin, and to transmit the steering movement, which can be transmitted from the handlebar bridge to the transmission pin, in the steering direction about the steering axis from the transmission pin to the fork bridge. For this purpose, it is preferably provided that the center of rotation or the rotational axis of the bearing, about which the transmission pin can be moved or rotated about the tilt axis, is on the tilt axis or is coaxial with respect to the latter.

To this end, it is provided in the case of one development that the bearing of the decoupling apparatus is a pivot bearing and has an inner ring and an outer ring. The inner ring of the pivot bearing is arranged on the transmission pin and is preferably arranged such that it can be displaced along a longitudinal direction of the transmission pin, and the outer ring of the pivot bearing is connected to the fork bridge and is received in the latter, with the result that the fork bridge can be rotated about the tilt axis by way of the pivot bearing or the transmission pin can be rotated in the fork bridge about the tilt axis by way of the pivot bearing. Moreover, the pivot bearing is preferably arranged with its center of rotation on the tilt axis and eccentrically with respect to the steering axis, with the result that the transmission pin which is mounted in the pivot bearing of the decoupling apparatus can be rotated about or on the tilt axis by way of the pivot bearing. A change, caused by way of a tilt movement, of a spacing between the fork bridge and the handlebar bridge can be compensated for by way of the displacement capability of the transmission pin in the bearing.

In the case of one variant, the pivot bearing of the decoupling apparatus comprises an inner ring and an outer ring. For this purpose, the inner ring preferably has a spherical, convex external diameter, the outer ring being shaped concavely on the inner side in a manner which corresponds to the former, with the result that the outer ring can be moved around the inner ring both about the rotational axis and about the tilt axis or about a bearing point (center of rotation) which is defined in the center of the inner ring. A pivot bearing of this type can likewise be configured as a bearing which was known on the application date as a UNIBAL pivot bearing.

Since substantially no rotation takes place about an axis which is parallel to the steering axis or about the steering axis in the pivot bearings of the decoupling apparatus, the bearing system can also be formed by way of one or more radial bearings which are arranged concentrically with respect to the tilt axis and mount the transmission pin such that it can be rotated about the tilt axis by means of an intermediate element which receives the transmission pin.

As an alternative to a solution which comprises a pivot or radial bearing, in a further advantageous variant, the bearing of the decoupling apparatus can have an elastic sleeve. The elastic sleeve of the bearing is arranged with an inner face directly or indirectly on the transmission pin and preferably displaceably along a longitudinal direction of the transmission pin and with an outer face directly or indirectly on the fork bridge. Furthermore, the elastic sleeve is received in the fork bridge, with the result that the fork bridge can be rotated about the tilt axis by way of an elastic deformation of the elastic sleeve or the respective transmission pin can be rotated about the tilt axis in the fork bridge by way of the elastic deformation of the elastic sleeve. The elastic sleeve and the transmission pin which is mounted therein are preferably arranged with their longitudinal axis on the tilt axis or intersecting the latter. A change, caused by way of a tilt movement, of a spacing between the fork bridge and the handlebar bridge can be compensated for by way of a displacement capability of the transmission pin in the bearing. Furthermore, the elastic sleeve can have different radial stiffnesses in the radial direction and/or axial direction.

It is provided in the case of a likewise advantageous development of the steering apparatus that the decoupling apparatus comprises at least one transmission element and at least one bearing for transmitting the steering torque. The at least one transmission element is fixed on the handlebar bridge eccentrically with respect to the steering axis, extends to the at least one bearing at least in part orthogonally with respect to the steering axis, and is connected to the bearing. The at least one bearing of the decoupling apparatus is received in the fork bridge and is configured to compensate for the tilt movement of the fork bridge in the tilt direction about the tilt axis with respect to the transmission element, in particular by way of rotation, and to transmit the steering torque and the steering movement, which can be transmitted from the handlebar bridge to the transmission element, in the steering direction about the steering axis from the transmission element to the fork bridge.

Here, one variant is advantageous, in the case of which the decoupling apparatus is configured as a decoupling element, and integrally forms the transmission element and the bearing for transmitting the steering torque. The decoupling element is configured so as to be substantially rigid about the steering axis, with the result that the steering torque can be transmitted, and elastic or reversibly deformable about the tilt axis, with the result that the tilt movement of the fork bridge with respect to the handlebar bridge can be compensated for by way of elastic deformation of the decoupling element. The decoupling element extends between the handlebar bridge and the fork bridge, and is fixed thereon. Here, a bearing is understood to mean a means for compensating for the movement of the fork bridge relative to the handlebar bridge, with the result that, in the case of said variant, the bearing is formed by way of the elastic deformability of the decoupling element about the tilt axis, it additionally being possible for a rubber bearing or the like to be provided, via which the decoupling element is connected to the fork bridge.

A further variant provides that the at least one transmission element is flat and extends substantially in a plane orthogonally with respect to the steering axis. As a result, the transmission element behaves rigidly in the plane, in which it extends flatly, with the result that longitudinal forces which are introduced into the transmission element can be forwarded into the transmission element about the steering axis without a substantial deformation of said transmission element.

Furthermore, the at least one transmission element is preferably resilient, and is formed from spring steel in the case of one advantageous variant.

In particular, the at least one transmission element can be configured as a metal plate.

If a decoupling apparatus with at least one transmission element is used, a further advantageous design variant provides that the decoupling apparatus has two transmission elements which are spaced apart along the steering axis and are connected to one another and to the handlebar bridge by way of a spacer bolt which runs substantially parallel to the steering axis. The spacer bolt can be mounted on the steering axis such that it can be rotated about an axis which is parallel to the tilt axis by way of a bearing system, it likewise being possible for said spacer bolt to be fixed rigidly on the handlebar bridge. The steering axis and a center or longitudinal axis of the spacer bolt run spaced apart from one another in a center plane which preferably intersects the steering apparatus symmetrically. Furthermore, the transmission elements are connected to one another by way of a connecting element which is arranged offset with respect to the center plane, and are further preferably connected at their respective ends in the longitudinal direction by way of in each case one connecting element. The connecting element is received in the bearing and is mounted by way of the bearing on the fork bridge. As an alternative, the connecting element is configured integrally with the bearing. The bearing or bearings of the decoupling device is/are preferably arranged with its/their center of rotation or its/their rotational axis on, or coaxially with respect to, the tilt axis, and the connecting element can be rotated by way of the respective bearing on or about the tilt axis. Moreover, the transmission elements are preferably arranged at least on the bearing symmetrically about the tilt axis. The transmission elements are not loaded by way of a tilt movement of the fork bridge, since the tilt movement is compensated for by way of the bearings of the decoupling apparatus. A steering movement or a steering torque is, however, transmitted by the transmission elements between the handlebar bridge and the fork bridge.

One likewise advantageous variant of the at least one decoupling apparatus provides, in addition, that the decoupling apparatus comprises at least one transmission pin which is provided on the handlebar bridge or the fork bridge, and which preferably extends substantially parallel to the steering axis from the handlebar bridge or the fork bridge to the respective other one into a recess which is provided on the respective other one. The recess has a longitudinal extent in a longitudinal direction which runs orthogonally with respect to the steering axis and orthogonally with respect to the tilt axis, and has a width extent in a width direction which runs parallel to the tilt axis. The longitudinal extent is greater than the width extent, with the result that the transmission pin can be displaced in the recess along the longitudinal direction of the recess or can be rotated about the tilt axis in the case of the tilt movement, without coming into contact with the walls of the recess which delimit the recess in its longitudinal direction, that is to say in the direction orthogonally with respect to the tilt axis. In the case of a tilt movement of the fork bridge, as a result of which a relative movement of the fork bridge with respect to the handlebar bridge occurs, the transmission pin can migrate or move in the recess along the longitudinal direction of the recess, as a result of which the tilt movement of the fork bridge is compensated for. In the case of a steering movement about the steering axis, the transmission pin comes to bear against the side walls of the recess which delimit the recess orthogonally with respect to the tilt axis, with the result that the steering forces can be transmitted as a result.

The recess does not have to be completely closed. It can also be provided, for example, that the transmission pin comes to bear against an outer contour of the fork bridge, with the result that the recess is formed by way of the outer contour of the fork bridge. It can be provided, in particular in the case of a pairing of two transmission pins, that each transmission pin can come to bear only against one surface of the fork bridge, with the result that the steering movement in a first direction about the steering axis is transmitted only by way of one of the transmission pins and in a second direction is transmitted only by way of the other one of the transmission pins.

A transmission pin of this type or a plurality of transmission pins of this type can be provided in addition to other decoupling apparatuses according to the invention, and can be called a safety pin here. In particular, an embodiment can also be provided which provides (first) transmission pins which are mounted in a bearing on the fork bridge as (first) decoupling apparatus, and provides at least one (second) transmission pin which extends into a recess as further (second) decoupling apparatus, as safety pin.

In order to minimize friction between the (second) transmission pin or safety pin and an inner wall of the recess, one advantageous development provides that the transmission pin bears in a slidable manner in the width direction of the recess against an inner wall of the recess, which inner wall points toward the transmission pin, or against a sliding insert which is arranged in the recess.

Moreover, the (second) transmission pin and/or the sliding insert can be formed at least in sections from a thermoplastic material. As an alternative to the thermoplastic material, another material which is abrasion-resistant and capable of sliding can also be used.

The steering apparatus can provide a plurality of decoupling apparatuses, in order to provide a redundancy for the transmission of the steering movement or the steering torque and to increase the safety. For example, in addition to a decoupling apparatus which uses transmission elements, a decoupling apparatus with a transmission pin can be provided. If damage occurs as a result of wear or overloading on the transmission elements, the vehicle can still be operated safely using the steering apparatus by way of the second decoupling apparatus. If the steering apparatus comprises a plurality of decoupling apparatuses, it can also be provided that the transmission pin or the safety pin is provided as a second decoupling apparatus, and the pin extends into the recess of the fork bridge, but preferably does not bear against the walls of the recess in normal operation and is at a spacing from said walls. Here, the safety pin or transmission pin serves for the redundancy of the decoupling apparatus and, for example, bears against the walls of the recess only in a steering movement in the case of a failure of the first decoupling apparatus, with the result that a steering torque is transmitted by the second decoupling apparatus only in the case of the failure of the first decoupling apparatus.

A further aspect of the invention relates, in addition, to a motorcycle comprising a steering apparatus according to the invention, the motorcycle having, furthermore, a front wheel suspension system with two fork legs, an upper fork bridge, a lower fork bridge, a trailing arm and a suspension strut. The upper and the lower fork bridge connect the fork legs to one another, the fork legs preferably being clamped on the upper fork bridge. The trailing arm connects the lower fork bridge movably to a motorcycle frame of the motorcycle, and the suspension strut supports the trailing arm with respect to the motorcycle frame. Here, the upper fork bridge is that fork bridge of the steering apparatus, by way of which the front wheel suspension is tilt-decoupled from a motorcycle handlebar of the motorcycle.

Accordingly, the motorcycle has substantially what was known as a Telelever on the application date, and a steering apparatus according to the invention, the upper fork bridge of which is tilt-decoupled from the handlebar bridge, with the result that a tilt movement of the front wheel suspension system or the fork legs is not transmitted to the motorcycle handlebar.

In addition, the front wheel suspension system of the motorcycle is additionally stiffened by way of the upper fork bridge or by virtue of the fact that the fork legs are connected to one another via two fork bridges, which has a positive effect on the riding behavior of the vehicle.

The features which are disclosed in the preceding text can be combined in any desired manner in so far as this is technically possible and said features are not inconsistent with one another.

Other advantageous developments of the invention are characterized in the subclaims and/or will be shown in greater detail in the following text together with the description of the preferred implementation of the invention on the basis of the figures.

DETAILED DESCRIPTION OF THE DRAWINGS

The figures are diagrammatic by way of example. Identical designations in the figures indicate identical functional and/or structural features.

Figure 1:
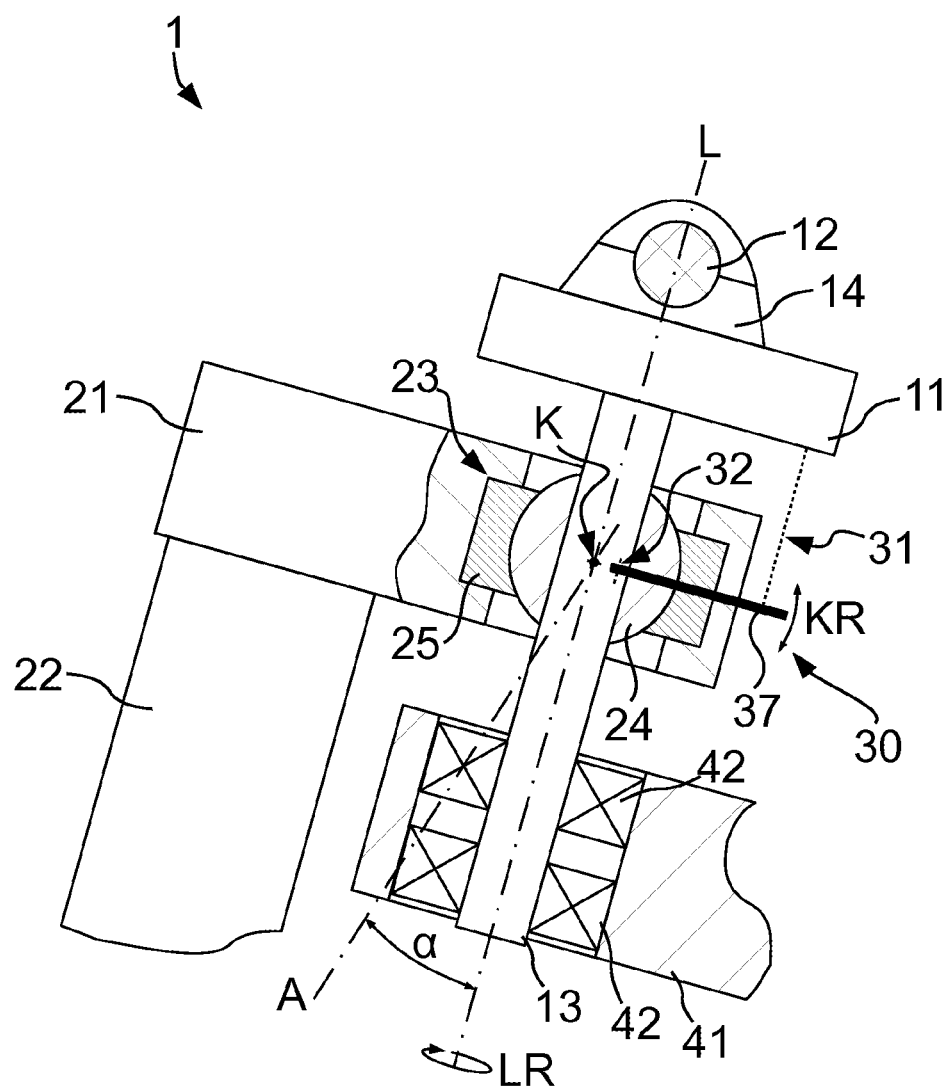
FIG. 1 shows a section through a first variant of a steering apparatus inaccordance with an embodiment of the present invention.
Figure 2:
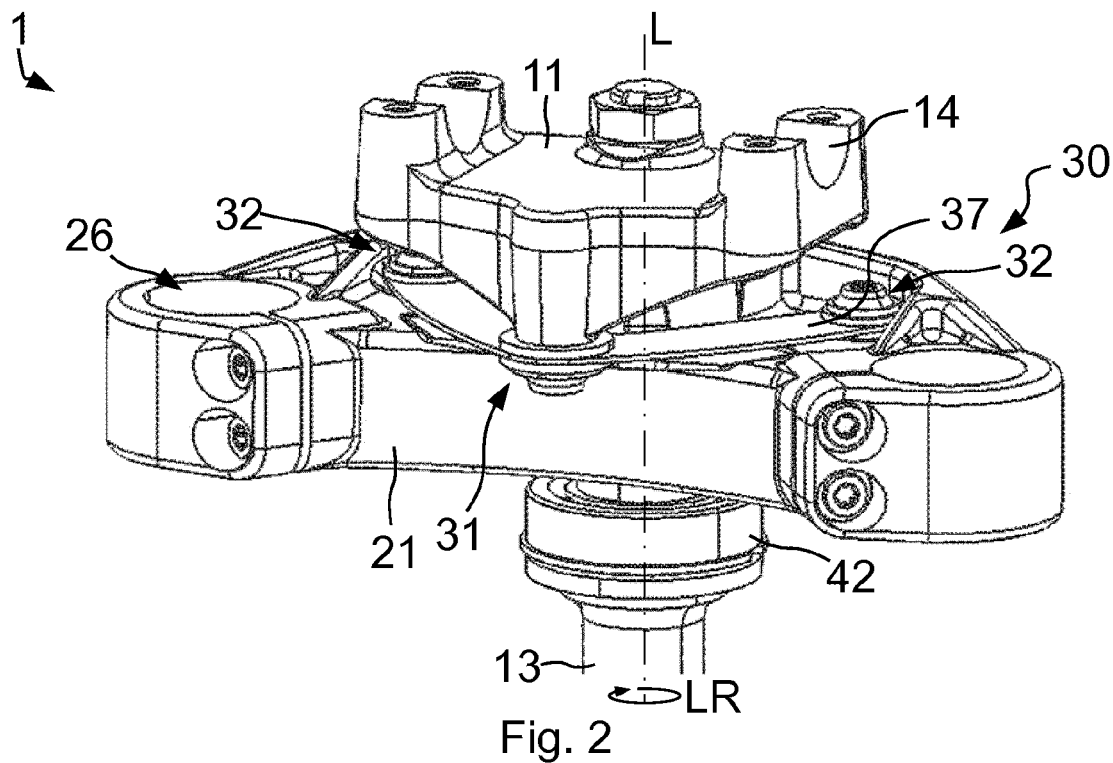
FIG. 2 shows a perspective view of the first variant of the steering apparatus.

FIG. 1 shows a first variant of the steering apparatus 1 according to and embodiment of the invention in a partially sectioned side view. The steering axis L lies in the plane of the illustration, and the tilt axis K lies perpendicularly with respect to the plane of the illustration, it being possible for the orientation of the tilt axis K to change in a manner which is dependent on a steering angle. The tilt axis K always runs, however, in a plane which is oriented orthogonally with respect to the steering axis L. In the case of a suspension movement of the front wheel suspension system, the fork bridge 21 with the preferably two fork legs 22 which are received on it pivots about the tilt axis K, with the result that the angle a between the steering axis L and an axis A which runs from the bearing point of the fork bridge 21 to the front wheel changes. The fork bridge 21 is mounted via a pivot bearing 23 on a steering pin 13, with the result that the fork bridge 21 can be both rotated about the steering axis L and tilted about the tilt axis K. Here, the bearing point of the fork bridge 21 is preferably defined by the pivot bearing 23 and lies on the steering axis L or at the point of intersection of the steering axis L and the tilt axis K, with the result that the fork bridge 21 can be pivoted about its bearing point in all directions. The steering pin 13 is preferably fixed on a handlebar bridge 11 such that it cannot be rotated. On the handlebar bridge 11, a motorcycle handlebar 12 can be fixed on a handlebar receptacle 14 of the handlebar bridge 11. Furthermore, the steering pin 13 is mounted or can be mounted rotatably by way of bearings 42 on a motorcycle frame 41 or a steering head which is connected to the motorcycle frame 41, on a section of the steering pin 13 which lies opposite the handlebar bridge 11, with the result that the handlebar bridge 11 can be rotated or steered with respect to the motorcycle frame 41 about the steering axis L which runs concentrically with respect to the steering pin 13, but cannot tilt with respect to the motorcycle frame 41. In order to transmit a steering movement along a steering direction LR about the steering axis L from the handlebar bridge 11 to the fork bridge 21, a decoupling apparatus 31 which is formed by way of a decoupling element in this variant is provided.

The pivot bearing 23 has a spherical inner ring 24 which is arranged on or around the steering pin 13 and is preferably fixed on the latter such that it cannot be rotated, and an outer ring 25 with an inner face which corresponds to the inner ring 24, with the result that the outer ring 25 or the fork bridge which is connected to the outer ring 25 can be rotated, in a manner which is limited by stops, in all directions about the inner ring 24 or the bearing point which lies centrally in the inner ring 24.

Figure 6:
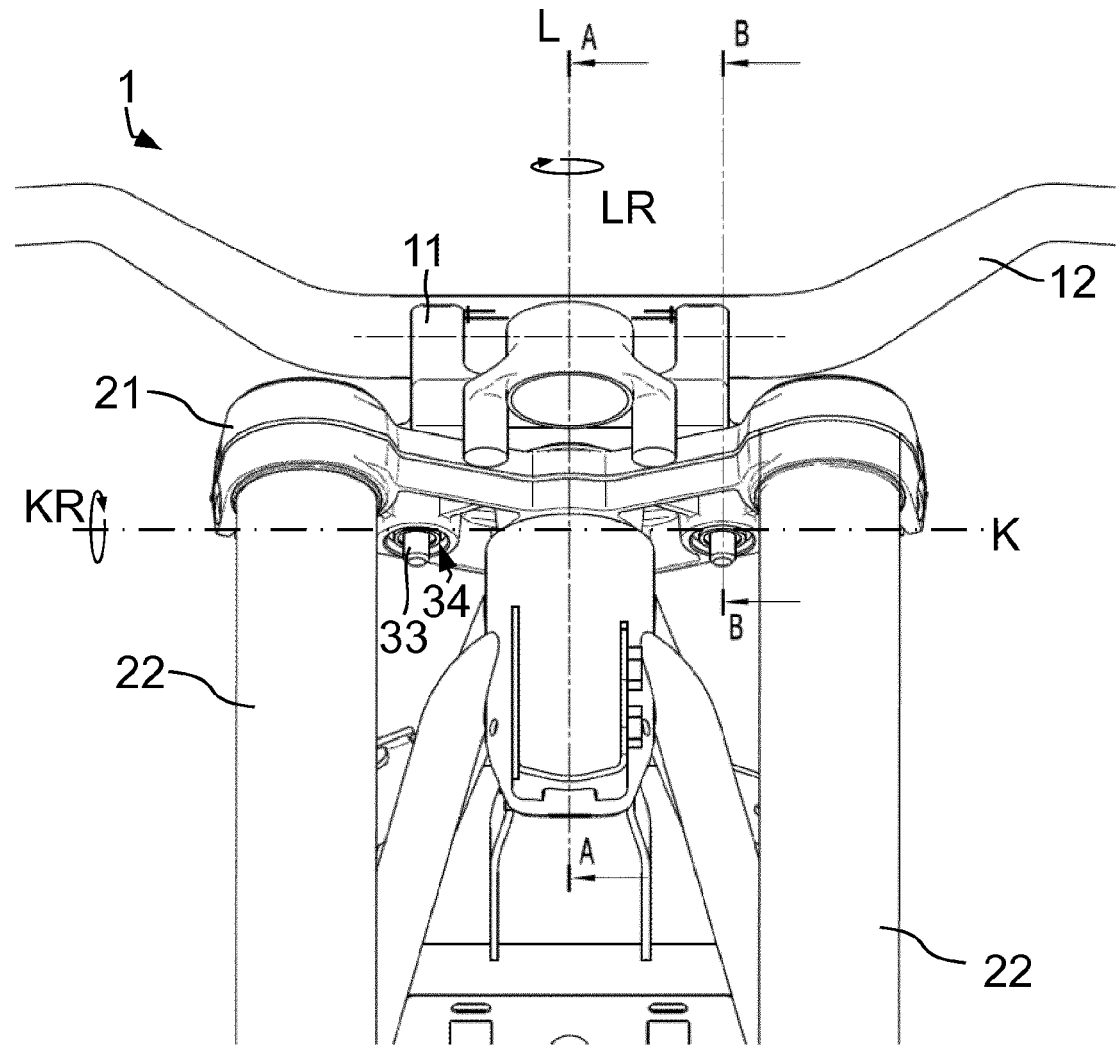
FIG. 6 shows a view from the front of a second variant of the steering apparatus in accordance with another embodiment of the present invention.
Figure 7:
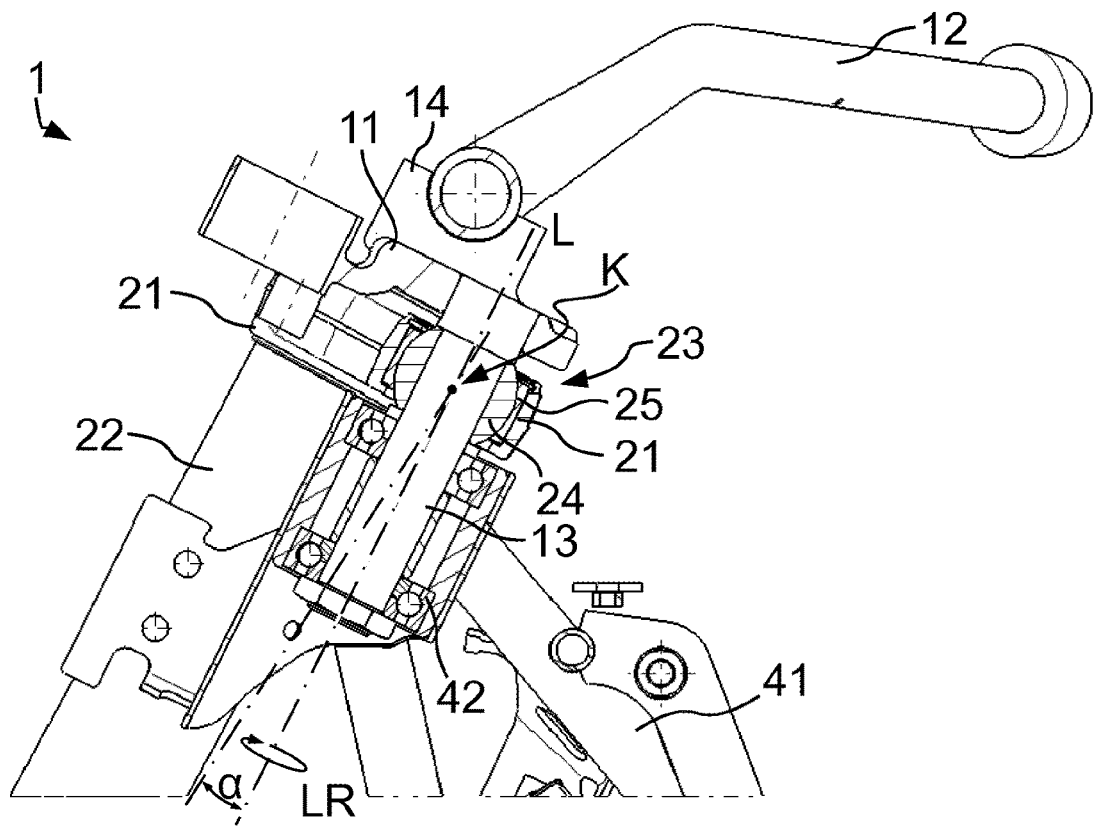
FIG. 7 shows a first section through the second variant of the steering apparatus.

To this end, the construction which is shown in FIG. 7 is identical apart from the variant of the decoupling apparatus 30 which therefore cannot be seen in FIG. 7. The alternative design variant of the sectional illustration of FIG. 7 is described in greater detail in the further description which belongs to FIGS. 6 to 8.

In the case of the embodiment, as shown in FIGS. 1 to 5, the decoupling apparatus 30 is configured as a decoupling element which integrally configures the transmission element 37 and, for each attachment point of the transmission element 37 to the fork bridge 21, in each case one bearing for transmitting the steering torque, the bearing for transmitting the steering torque being formed by way of the rigid attachment of the transmission element 37 to the handlebar bridge 11 and the fork bridge 21 and the reversible plastic deformation capability or elasticity about the tilt axis. Furthermore, the decoupling apparatus 30 in FIGS. 1 to 5 therefore corresponds to the decoupling element or the transmission element 37. The transmission element 37 or the decoupling element is arranged between the handlebar bridge 11 and the fork bridge 21, and is fixed rigidly on the handlebar bridge 11 via at least one first connecting arrangement 31 and rigidly on the fork bridge 21 via at least one second connecting arrangement 32. The transmission element 37 extends substantially in a plane orthogonally with respect to the steering axis L, with the result that steering forces which are introduced into the transmission element 37 as longitudinal forces about the steering axis L or along the steering direction LR can be transmitted from the first connecting arrangement 31 to the second connecting arrangements 32 without a substantial deformation of the transmission element 37, as a result of which a steering movement can be transmitted directly from the handlebar bridge 11 to the fork bridge 21, and the transmission element 37 exhibits rigid behavior about the steering axis L. In the direction of the tilt movement about the tilt axis K, the first connecting arrangement 31 is spaced apart from the second connecting arrangements 32, with the result that tilt forces about the tilt axis K or along the tilt direction KR are introduced as transverse forces into the transmission element 37, which transverse forces, lying substantially perpendicularly on the plane which is orthogonal with respect to the steering axis L, lead to an elastic deformation of the transmission element 37, the transmission element 37 compensating, by way of elastic deformation, for a changing spacing or a tilt between the handlebar bridge 11 and the fork bridge 21 in the case of a change of the angle a or in the case of a tilt movement in the tilt direction KR.

Figure 3:
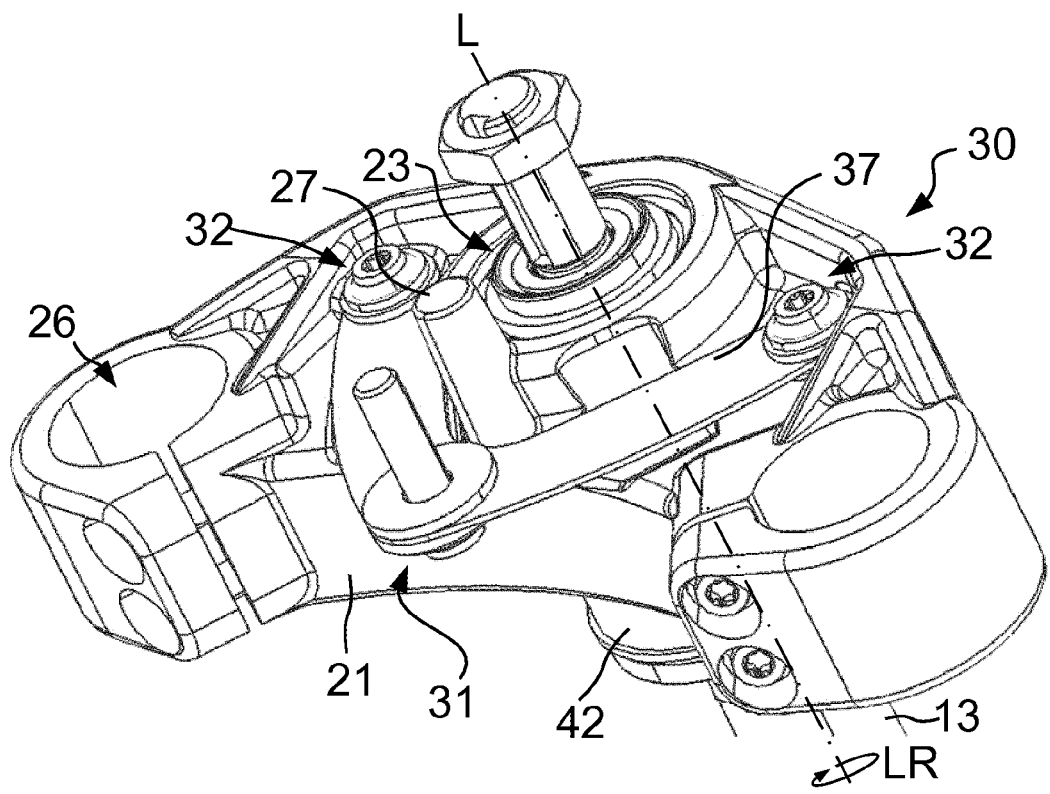
FIG. 3 shows a perspective view of a part of the first variant of the steering apparatus.
Figure 4:
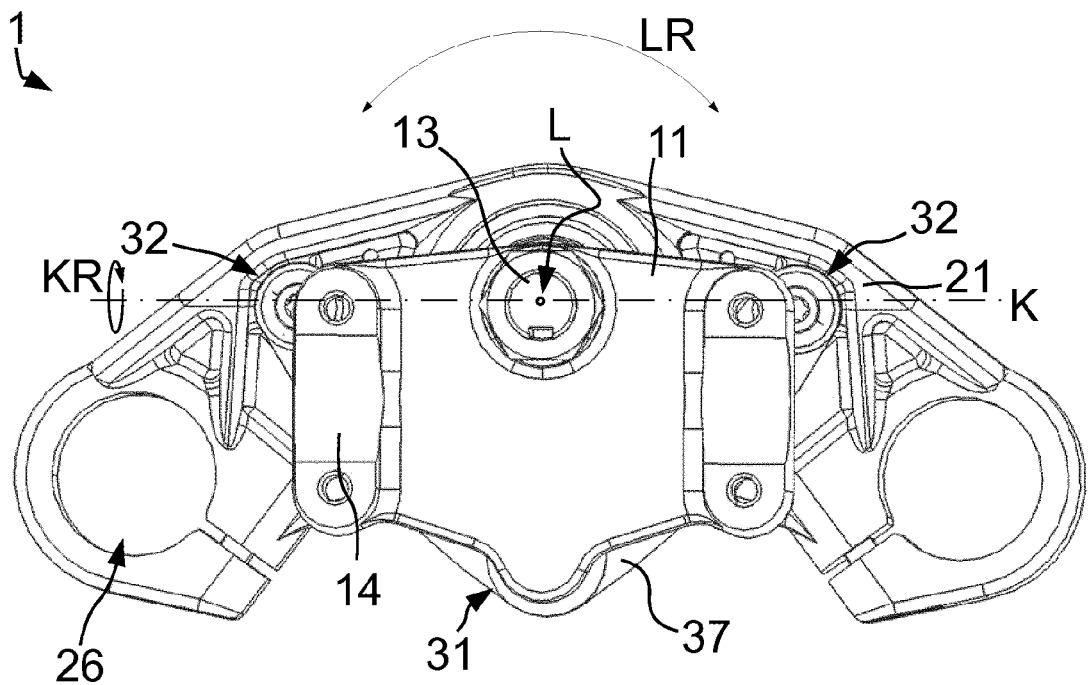
FIG. 4 shows a view from above of the first variant of the steering apparatus.
Figure 5:
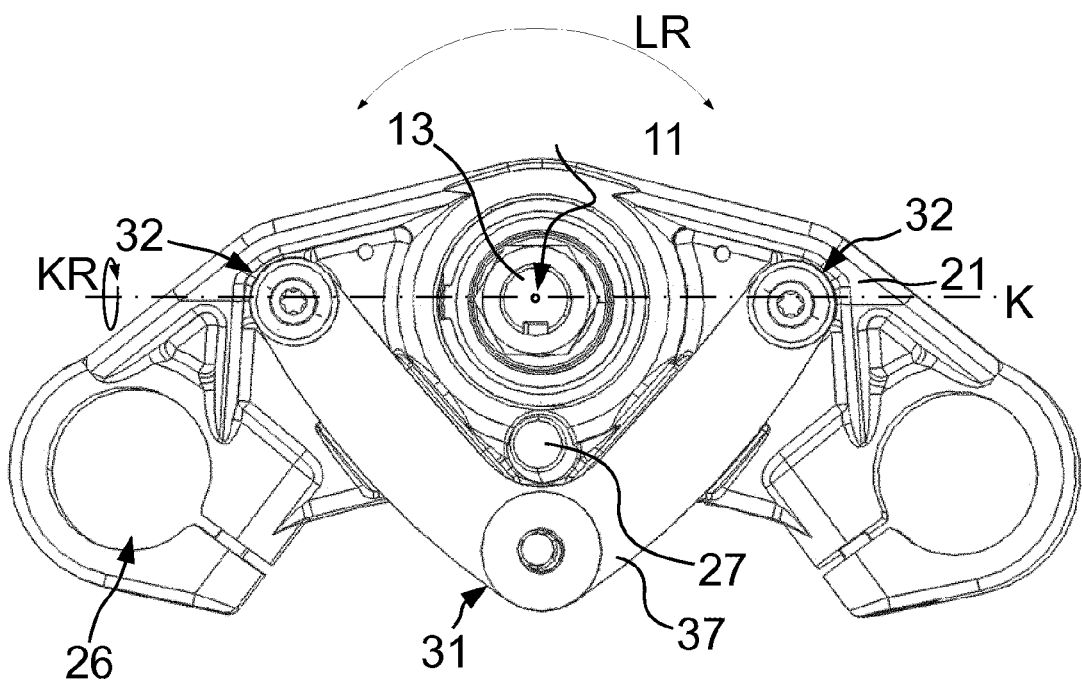
FIG. 5 shows a view from above of a part of the first variant of the steering apparatus.

FIGS. 2 to 5 likewise show the first design variant or parts of the first variant of the steering apparatus 1, the steering apparatus 1 being shown without the handlebar bridge 11 in FIGS. 3 and 5.

The illustrated variant of the steering apparatus 1 provides in each case two fork leg receptacles 26 on the fork bridge 21, with the result that two fork legs 22 can be fixed on the fork bridge 21. Moreover, the transmission element 37 is configured in an arcuate manner or in the shape of a boomerang, and is arranged symmetrically about the steering axis L, in each case a second connecting arrangement 32 being provided on in each case one end-side section of the transmission element 37. Furthermore, the second connecting arrangements 32 are arranged on the tilt axis K. A first connecting arrangement 31 is provided symmetrically between the second connecting arrangements 32 in a symmetry or center plane through the steering apparatus 1, with the result that a tilt movement of the fork bridge 21 with respect to the handlebar bridge 11 which is fixed counter to the tilt movement is compensated for by the decoupling element by way of a symmetrical deformation, in each case the sections of the transmission element 37 between one of the second connecting arrangements 32 and the first connecting arrangement 31 being deformed, in particular, reversibly or elastically in the tilt direction KR.

Furthermore, FIGS. 3 and 5 show a transmission or safety pin 27 which is configured by the fork bridge 21 and extends in the direction of or into a recess (not shown) of the handlebar bridge 11. The transmission or safety pin 27 is configured to transmit a steering movement or steering force in the case of an impermissible deformation and/or a mechanical failure of the transmission element 37 between the handlebar bridge 11 and the fork bridge 21.

Figure 8:
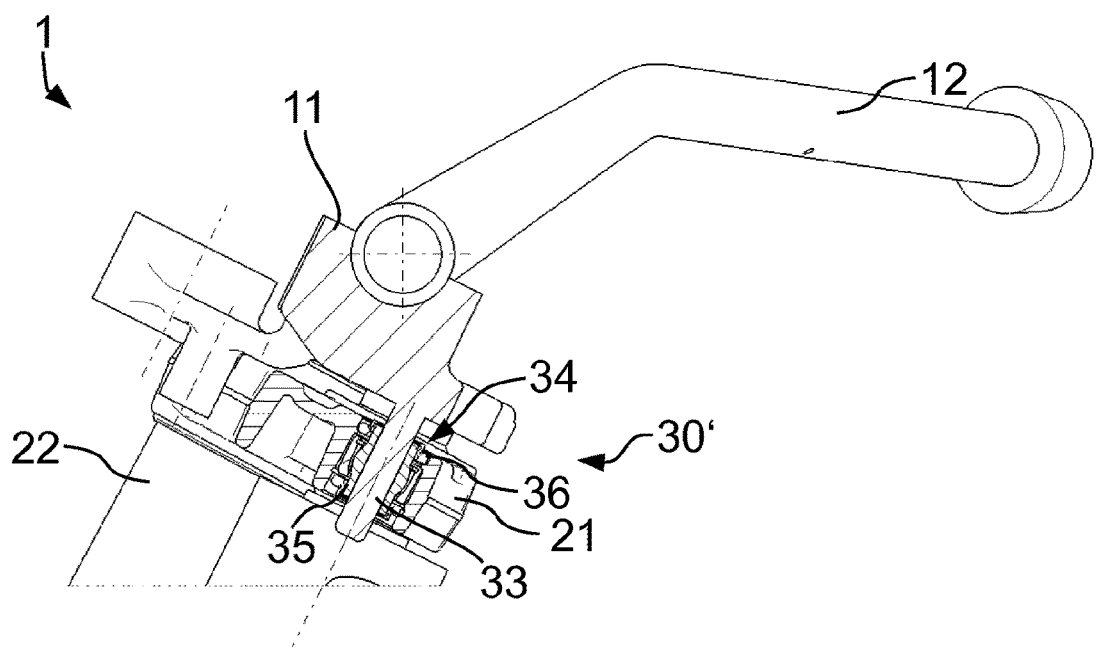
FIG. 8 shows a second section through the second variant of the steering apparatus.

A second variant of the steering apparatus 1 according to the invention is illustrated in FIGS. 6 to 8, in the case of which second variant the decoupling apparatus is defined by way of two transmission pins 33 which are offset with respect to the steering axis L and are arranged symmetrically with respect to the steering axis L.

FIG. 7 shows a first section, following the sectional course A-A, through the steering apparatus 1, as illustrated in FIG. 6, which section at the same time is a longitudinal section through the steering pin 13.

The sectional illustration of FIG. 8 is offset in parallel with respect to the section from FIG. 7 and, as a result, shows one of the two transmission pins 33 in longitudinal section, the section of FIG. 8 following the sectional course B-B as illustrated in FIG. 6.

The variant which is shown in FIGS. 6 to 8 provides that the transmission pins 33 are configured integrally with the handlebar bridge 11 and extend from the latter into the fork bridge 21, said transmission pins 33, in the fork bridge 21, bearing against the fork bridge 21 by way of in each case one bearing which is configured as a pivot bearing 34, in order to transmit the steering torque, with the result that steering forces can be transmitted via the transmission pins 33 and the pivot bearings 34 from the handlebar bridge 11 to the fork bridge 21.

As shown in FIG. 8, the pivot bearings 34 in each case comprise an inner ring 35 which bears against the respective transmission pin 33, it being possible for the transmission pin 33 to slide in the inner ring 35. Moreover, the pivot bearing 34 comprises an outer ring 36 which is connected on its inner side to the inner ring 35 and on its outer side to the fork bridge 21, with the result that the steering forces can be transmitted from the respective transmission pin 33 to the inner ring 35, from the inner ring 35 to the outer ring 36, and from the outer ring 36 to the fork bridge 21. In addition, the inner ring 35 is configured so as to be convex with respect to the outer ring 36, and the outer ring 36 is configured so as to correspond thereto. Accordingly, in the variant which is shown, the pivot bearing 34 is configured as a bearing which was known on the application date as a so-called UNIBAL bearing, with the result that the inner ring 35 can rotate with respect to the outer ring 36 about a center of rotation which lies centrally with respect to the inner ring 35, it being possible for a movement of the handlebar bridge 11 relative to the fork bridge 21 about the tilt axis K to be compensated for by way of the rotational capability of the inner ring 35 with respect to the outer ring 36 and by way of the sliding capability of the respective transmission pin 33 in the inner ring 35.

Figure 9:
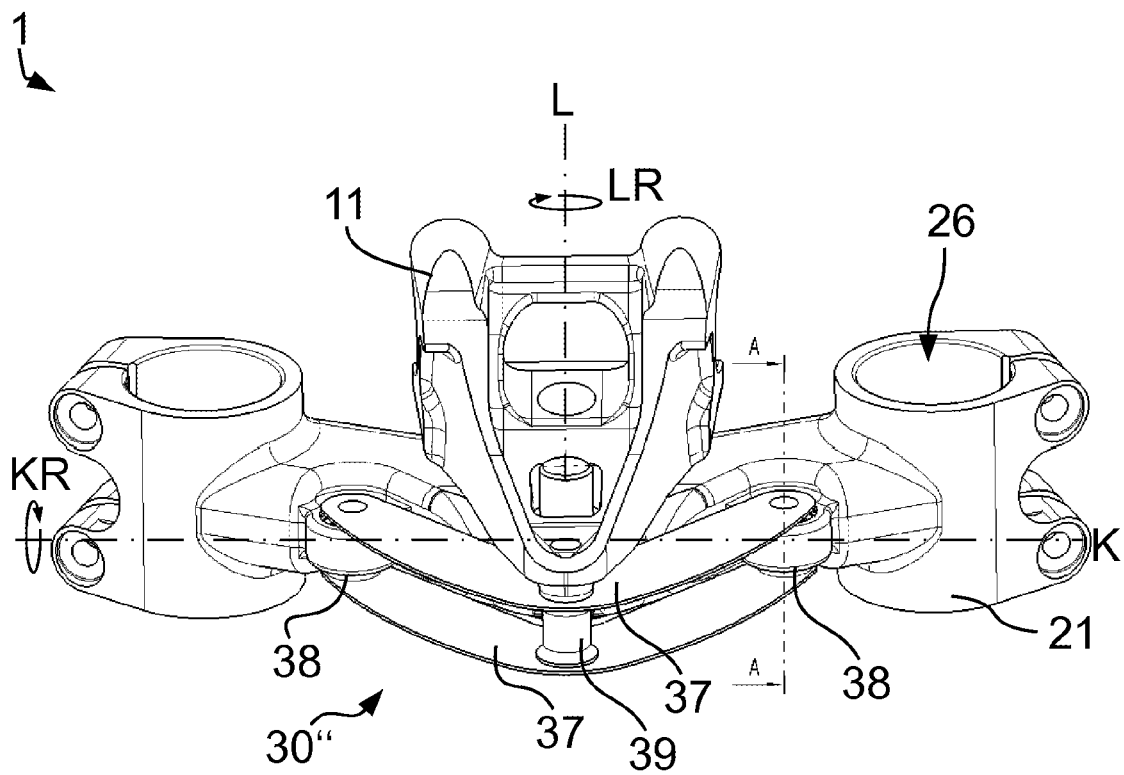
FIG. 9 shows a perspective view of a third variant of the steering apparatus in accordance with further embodiment of the present invention.
Figure 10:
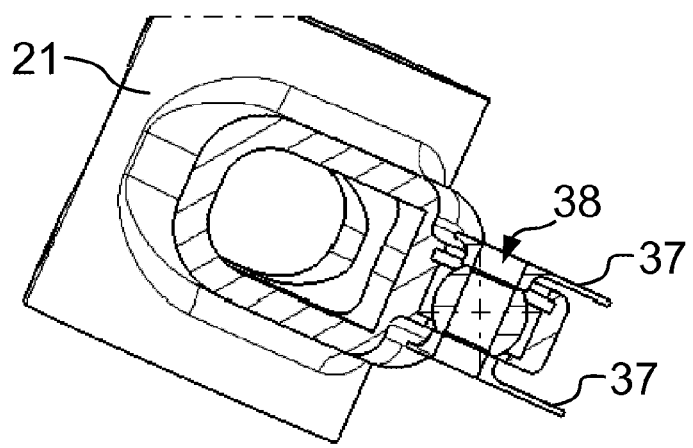
FIG. 10 shows a section through the third variant of the steering apparatus.

FIGS. 9 and 10 show a further advantageous variant of the steering apparatus 1 according to the invention, FIG. 9 showing the steering apparatus 1 in a perspective manner, and FIG. 10 showing a sectional illustration through the steering apparatus 1, which sectional illustration follows the sectional course A-A which is illustrated in FIG. 9.

The steering apparatus 1 in FIGS. 9 and 10 comprises a decoupling apparatus 30" with two transmission elements 37 which are spaced apart along the steering axis L and are connected to one another and to the handlebar bridge 11 by way of a spacer bolt 39 which runs substantially parallel to the steering axis L. From a top view or a view from above of the steering apparatus 1, the transmission elements 37 are substantially congruent and are configured in a boomerang-shaped manner, said transmission elements 37 being connected at their respective outer ends to the fork bridge 21 jointly via in each case one bearing 38. To this end, the transmission elements 37 are connected at their outer ends by way of a connecting element (not shown), such as, for example, a bolt or a screw/nut combination, which connecting element extends through the respective bearing 38 and, as a result, fixes the transmission elements 37 on the respective bearing 38. As shown in FIG. 10, the bearing is configured as a pivot bearing which was known on the application date as a UNIBAL bearing, it also being possible, as an alternative, for it to be configured as another pivot bearing or as a radial bearing.

The spacer bolt 39 is fastened rigidly to the handlebar bridge 11. In addition, the transmission elements 37 run substantially orthogonally with respect to the steering axis L, with the result that they exhibit rigid behavior with regard to a force or torque about the steering axis L, and a steering force can be transmitted from the handlebar bridge 11 to the fork bridge 21 via the transmission elements 37 and the respective attachments to the fork bridge 21 and the handlebar bridge 11. The transmission elements 37 are in turn elastically deformable with respect to a torque or a force about the tilt axis K, with the result that the tilt movement can be additionally compensated for.

The implementation of the invention is not restricted to the preferred exemplary embodiments which are indicated above. Rather, a number of variants are conceivable which make use of the solution which is shown, even in the case of designs of a fundamentally different type.

What is claimed is:

1. A tilt-decoupled steering apparatus of a motorcycle, comprising:
   a handlebar bridge configured to receive a motorcycle handlebar;
   a fork bridge configured to receive a fork leg; and
   at least one decoupling apparatus,
   wherein
      the at least one decoupling apparatus connects the handlebar bridge to the fork bridge,
      the handlebar bridge is rotatable about a steering axis and fixed about a tilt axis which is orthogonal to the steering axis,
      the fork bridge is rotatable about the steering axis and about the tilt axis, and
      the at least one decoupling apparatus is elastic and is configured to
         transmit from the handlebar bridge to the fork bridge a steering movement and a steering torque in a steering direction about the steering axis, and
         compensate by way of elastic deformation a tilt movement in a tilt direction about the tilt axis, orthogonal with respect to the steering axis, of the fork bridge relative to the handlebar bridge.

2. The steering apparatus according to claim 1, further comprising:
   a steering pin fixed on the handlebar bridge,
   wherein
      the steering pin extends coaxially along the steering axis and rotatably mountable on a motorcycle frame of the motorcycle, and
      the handlebar bridge is connectable via the steering pin to the motorcycle frame such that the handlebar bridge is rotatable about the steering axis and is fixed about the tilt axis.

3. The steering apparatus according to claim 2, further comprising:
   a pivot bearing having an inner ring and an outer ring,
   wherein
      the inner ring of the pivot bearing is arranged on the steering pin concentrically with respect to the steering axis,
      the outer ring of the pivot bearing is connected to the fork bridge, and
      the fork bridge is connectable by way of the pivot bearing to the motorcycle frame such that the fork bridge is rotatable about the steering axis and about the tilt axis.

4. The steering apparatus according to claim 3, wherein the decoupling apparatus includes at least one transmission pin and a bearing for transmitting the steering torque,
   the transmission pin is fixed on the handlebar bridge eccentrically with respect to the steering axis and extending from the handlebar bridge into the bearing of the decoupling apparatus, and
   the bearing of the decoupling apparatus is received in the fork bridge and is configured to
      compensate for the tilt movement of the fork bridge in the tilt direction about the tilt axis with respect to the transmission pin, and
      transmit steering movement transmitted from the handlebar bridge to the transmission pin in the steering direction about the steering axis from the transmission pin to the fork bridge.

5. The steering apparatus according to claim 4, wherein the bearing of the decoupling apparatus is a pivot bearing, the pivot bearing having an inner ring and an outer ring,
   the inner ring of the pivot bearing is arranged on the transmission pin,
   the outer ring of the pivot bearing is connected to and received in the fork bridge, and
   the transmission pin is rotatable in the fork bridge about the tilt axis.

6. The steering apparatus according to claim 4, wherein the bearing of the decoupling apparatus includes an elastic sleeve,
   the elastic sleeve of the bearing has an inner face directly or indirectly on the transmission pin and an outer face directly or indirectly on the fork bridge,
   the elastic sleeve is received in the fork bridge, and
   the transmission pin is rotatable in the fork bridge about the tilt axis by elastic deformation of the elastic sleeve.

7. The steering apparatus according to claim 1, wherein the decoupling apparatus includes at least one transmission pin provided on the handlebar bridge or the fork bridge,
   the at least one transmission pin extends from the handlebar bridge or the fork bridge into a recess provided on the other one of the handlebar bridge or the fork bridge,
   the recess has a longitudinal extent in a longitudinal direction which is orthogonal to the steering axis and orthogonal to the tilt axis,
   the recess has a width in a width direction parallel to the tilt axis, and
   the longitudinal extent is greater than the width extent, such that the at least one transmission pin is displaceable in the recess along the longitudinal direction of the recess in response to tilt movement.

8. The steering apparatus according to claim 7, wherein the at least one transmission pin slidably bears in the width direction of the recess against an inner wall of the recess, or against a sliding insert arranged in the recess.

9. The steering apparatus according to claim 8, wherein at least one of the at least one transmission pin and the sliding insert is formed at least in sections from a thermoplastic material.

10. A tilt-decoupled steering apparatus of a motorcycle, comprising:
    a handlebar bridge configured to receive a motorcycle handlebar;
    a fork bridge configured to receive a fork leg; and
    at least one decoupling apparatus,
    wherein
       the at least one decoupling apparatus connects the handlebar bridge to the fork bridge,
       the handlebar bridge is rotatable about a steering axis and fixed about a tilt axis which is orthogonal to the steering axis, the fork bridge is rotatable about the steering axis and about the tilt axis, the at least one decoupling apparatus is configured to transmit from the handlebar bridge to the fork bridge a steering movement and a steering torque in a steering direction about the steering axis, and compensate for a tilt movement in a tilt direction about the tilt axis of the fork bridge relative to the handlebar bridge, the decoupling apparatus includes at least one transmission element and at least one decoupling apparatus bearing for transmitting the steering torque, the at least one transmission element is fixed on the handlebar bridge eccentrically with respect to the steering axis and extends to the at least one decoupling apparatus bearing at least in part orthogonally with respect to the steering axis, and to the decoupling apparatus bearing, the at least one decoupling apparatus bearing is received in the fork bridge and is configured to compensate for the tilt movement of the fork bridge in the tilt direction about the tilt axis with respect to the transmission element, and the at least one decoupling apparatus bearing and the at least one transmission element are configured to transmit the steering torque and the steering movement in the steering direction about the steering axis from the handlebar bridge to the fork bridge.

11. The steering apparatus according to claim 10, wherein the decoupling apparatus is a decoupling element integrally formed the at least one transmission element and the at least one decoupling apparatus bearing, and the decoupling element is configured to be rigid about the steering axis and elastic about the tilt axis, extend between the handlebar bridge and the fork bridge, and being fixed on the fork bridge.

12. The steering apparatus according to claim 10, wherein the at least one transmission element is flat and extends substantially in a plane orthogonal to the steering axis.

13. The steering apparatus according to claim 12, wherein the at least one transmission element is formed from spring steel.

14. The steering apparatus according to claim 10, wherein the decoupling apparatus includes two transmission elements spaced apart along the steering axis and connected to one another and to the handlebar bridge by a spacer bolt which is substantially parallel to the steering axis, the steering axis and a center axis of the spacer bolt are spaced apart from one another in a center plane, the two transmission elements are connected to one another by a connecting element arranged offset with respect to the center plane, and the connecting element is received in the at least one decoupling apparatus bearing and is mounted by way of the at least one decoupling apparatus bearing on the fork bridge or the connecting element is configured integrally with the at least one decoupling apparatus bearing.

15. A motorcycle comprising a steering apparatus, comprising:

a front wheel suspension system having two fork legs, an upper fork bridge and a lower fork bridge, the fork bridges being configured to receive the two fork legs, a trailing arm, a suspension strut, and a tilt-decoupled steering apparatus of a motorcycle, the tilt-decoupled steering apparatus including a handlebar bridge configured to receive a motorcycle handlebar, and at least one decoupling apparatus, wherein the at least one decoupling apparatus connects the handlebar bridge to the upper fork bridge, the handlebar bridge is rotatable about a steering axis and fixed about a tilt axis which is orthogonal to the steering axis, the upper fork bridge is rotatable about the steering axis and about the tilt axis, the at least one decoupling apparatus is elastic and is configured to transmit from the handlebar bridge to the upper fork bridge a steering movement and a steering torque in a steering direction about the steering axis, and compensate by way of elastic deformation a tilt movement in a tilt direction about the tilt axis, orthogonal with respect to the steering axis, of the upper fork bridge relative to the handlebar bridge, the upper and the lower fork bridge connect the two fork legs to one another, the trailing arm connects the lower fork bridge movably to a motorcycle frame of the motorcycle, and the suspension strut supports the trailing arm with respect to the motorcycle frame.

* * * * *